(12) United States Patent
Whitaker et al.

(10) Patent No.: US 11,339,058 B2
(45) Date of Patent: May 24, 2022

(54) MANUFACTURING OF PEROVSKITE FILMS

(71) Applicant: Alliance for Sustainable Energy, LLC, Golden, CO (US)

(72) Inventors: James Bacon Whitaker, Denver, CO (US); Kai Zhu, Littleton, CO (US); Marinus Franciscus Antonius Maria van Hest, Lakewood, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 181 days.

(21) Appl. No.: 16/713,424

(22) Filed: Dec. 13, 2019

(65) Prior Publication Data

US 2020/0189927 A1    Jun. 18, 2020

Related U.S. Application Data

(60) Provisional application No. 62/779,763, filed on Dec. 14, 2018.

(51) Int. Cl.
 *C01G 21/16* (2006.01)
 *C07F 13/00* (2006.01)

(52) U.S. Cl.
 CPC ............ *C01G 21/16* (2013.01); *C07F 13/005* (2013.01); *C01P 2002/34* (2013.01); *C01P 2002/72* (2013.01)

(58) Field of Classification Search
 CPC ..... C01P 2002/34; H01L 51/42; H01L 21/368
 See application file for complete search history.

(56) References Cited

U.S. PATENT DOCUMENTS

| | | |
|---|---|---|
| 2017/0084399 A1 | 3/2017 | Vak |
| 2017/0186559 A1* | 6/2017 | Zhu ..................... H01L 51/4226 |
| 2018/0151813 A1 | 5/2018 | Zhu et al. |
| 2018/0299208 A1* | 10/2018 | Saidaminov .......... F28D 20/003 |
| 2019/0115549 A1* | 4/2019 | Snaith ..................... H01L 51/42 |

FOREIGN PATENT DOCUMENTS

WO    WO 2017153752 A1 *   9/2017   ........... H01L 21/368

OTHER PUBLICATIONS

Burgues-Ceballos et al., "The influence of additives in the stoichiometry of hybrid lead halide perovskites," AIP Advances, vol. 7, 2017, pp. 115304-1 to 115304-6.

International Search Report from corresponding PCT patent application No. PCT/US19/66226 dated Feb. 19, 2020, 3 pages.

Written Opinion of the International Searching Authority from corresponding PCT patent application No. PCT/US19/66226 dated Feb. 19, 2020, 4 pages.

(Continued)

*Primary Examiner* — Khanh T Nguyen
(74) *Attorney, Agent, or Firm* — Michael A. McIntyre

(57) ABSTRACT

The present disclosure relates to a mixture that includes a perovskite precursor, a solvent, and an additive that includes at least one of a first amine, a ketone, an aldehyde, a non-nucleophilic sterically hindered base, and/or a halogen-containing compound, where, upon removal of the solvent and the additive, the perovskite precursor is capable of being transformed into a perovskite.

23 Claims, 13 Drawing Sheets

(56) References Cited

OTHER PUBLICATIONS

Beck, M. et al., "Controlling the crystallization and grain size of sequentially deposited planar perovskite films via the permittivity of the conversion solution," Elsevier Organic Electronics, vol. 50, 2017, pp. 87-93.

Cataldo, F., "A Revision of the Gutmann Donor Numbers of a Series of Phosphoramides Including TEPA," Eur. Chem. Bull., vol. 4, No. 2, 2015, pp. 92-97.

Fernandez, B. et al., "Theoretical Study of Some Nitriles: Intramolecular Hydrogen Bonds and Anomeric Effect," Journal of Computational Chemistry, vol. 13, No. 6, 1992, pp. 722-729.

Hamill, J., Jr. et al., "Influence of Solvent Coordination on Hybrid Organic-Inorganic Perovskite Formation," ACS Energy Letters, vol. 3, 2018, pp. 92-97.

Noel, N. et al., "A low viscosity, low boiling point, clean solvent system for the rapid crystallisation of highly specular perovskite films," RSC Energy & Environmental Science, vol. 10, 2017, pp. 145-152.

Ramadan, A. et al., "Processing Solvent-Dependent Electronic and Structural Properties of Cesium Lead Triiodide Thin Films," Journal of Physical Chemistry Letters, vol. 8, 2017, pp. 4172-4176.

Saidaminov, M. et al., "Retrograde solubility of formamidinium and methylammonium lead halide perovskites and enabling rapid single crystal growth," RSC ChemComm, vol. 51, 2015, pp. 17658-17661.

Stevenson, J. et al., "Mayer Bond Order as metric of Complexation Effectiveness in Lead Halide Perovskite Solutions," ACS Chemistry of Materials, vol. 29, 2017, pp. 2435-2444.

Wang, H. et al., "Formation and dispersion of organometal halide perovskite nanocrystals in various solvents," Elsevier Journal of Colloid and Interface Science, vol. 529, 2018, pp. 575-581.

Yang, S. et al., "Formation of high-quality perovskite thin film for planar heterojunction solar cells," RSC Advances, vol. 5, 2015, pp. 69502-69508.

\* cited by examiner

MANUFACTURING OF PEROVSKITE FILMS

CROSS-REFERENCE TO RELATED APPLICATIONS

This application claims priority from U.S. Provisional Patent Application No. 62/779,763 filed Dec. 14, 2018, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

SUMMARY

An aspect of the present disclosure is a mixture that includes a perovskite precursor, a solvent, and an additive that includes at least one of a first amine, a ketone, an aldehyde, a non-nucleophilic sterically hindered base, and/or a halogen-containing compound, where, upon removal of the solvent and the additive, the perovskite precursor is capable of being transformed into a perovskite. In some embodiments of the present disclosure, the additive may be present at a first concentration relative to the solvent between greater than 0% v/v and less than or equal to 20% v/v. In some embodiments of the present disclosure, the perovskite may have a stoichiometry of $ABX_3$, where A is a first cation, B is a second cation, and X is an anion. In some embodiments of the present disclosure, the perovskite precursor may include at least one of methylammonium chloride (MACl), methylammonium bromide (MABr), methylammonium iodide (MAI), formamidinium chloride (FACl), formamidinium bromide (FABr), formamidinium iodide (FAI), lead iodide ($PbI_2$), tin iodide, cesium chloride, cesium bromide, and/or cesium iodide.

In some embodiments of the present disclosure, the ketone may include at least one of 4,4-dimethyl-2-pentanone, acetone, 2-heptanone, and/or 2,4-dimethyl-3-pentanone. In some embodiments of the present disclosure, the aldehyde may include at least one of acetaldehyde and/or benzaldehyde. In some embodiments of the present disclosure, the non-nucleophilic sterically hindered base may include at least one of diisopropylethylamine, triethylamine, 2,6-di-t-butylpyridine, and/or 1,8-diazabicycloundec-7-ene. In some embodiments of the present disclosure, the halogen-containing compound and the perovskite precursor may be at a ratio (halogen-containing compound:perovskite precursor) between greater than 0.0:1.0 and equal to 1.0:2:0.

In some embodiments of the present disclosure, the perovskite precursor may include $PbI_2$ at a second concentration between about 0.01 moles of $PbI_2$ per liter of solvent and about 10 moles of $PbI_2$ per liter of solvent, inclusively. In some embodiments of the present disclosure, the additive may include 4,4-dimethyl-2-pentanone. In some embodiments of the present disclosure, the 4,4-dimethyl-2-pentanone may be at a third concentration between 0.1 v/v % and 20 v/v %, inclusively, relative to the solvent. In some embodiments of the present disclosure, the additive may further include diisopropylethylamine. In some embodiments of the present disclosure, the diisopropylethylamine may be at a fourth concentration between about 0.01 v/v % and about 10 v/v %, inclusively. In some embodiments of the present disclosure, the mixture may further include water. In some embodiments of the present disclosure, the water may be soluble in the mixture. In some embodiments of the present disclosure, the water may be present as a second phase in the mixture.

An aspect of the present disclosure is a method that includes combining a perovskite precursor, a solvent, and an additive to form a mixture, applying the mixture to a substrate, and treating the mixture, where the treating results in the removing of at least a portion of the solvent and the additive and the forming of a perovskite. In some embodiments of the present disclosure, at least one of the mixing, the applying, and/or the treating may be performed in an environment having a relative humidity between 0% and 100%. In some embodiments of the present disclosure, the relative humidity may be between about 30% and 40%. In some embodiments of the present disclosure, the mixture may further include water.

BRIEF DESCRIPTION OF THE DRAWINGS

Some embodiments of the present disclosure are illustrated in the referenced figures of the drawings. It is intended that the embodiments and figures disclosed herein are to be considered illustrative rather than limiting.

REFERENCE NUMBERS

Figure 1A:
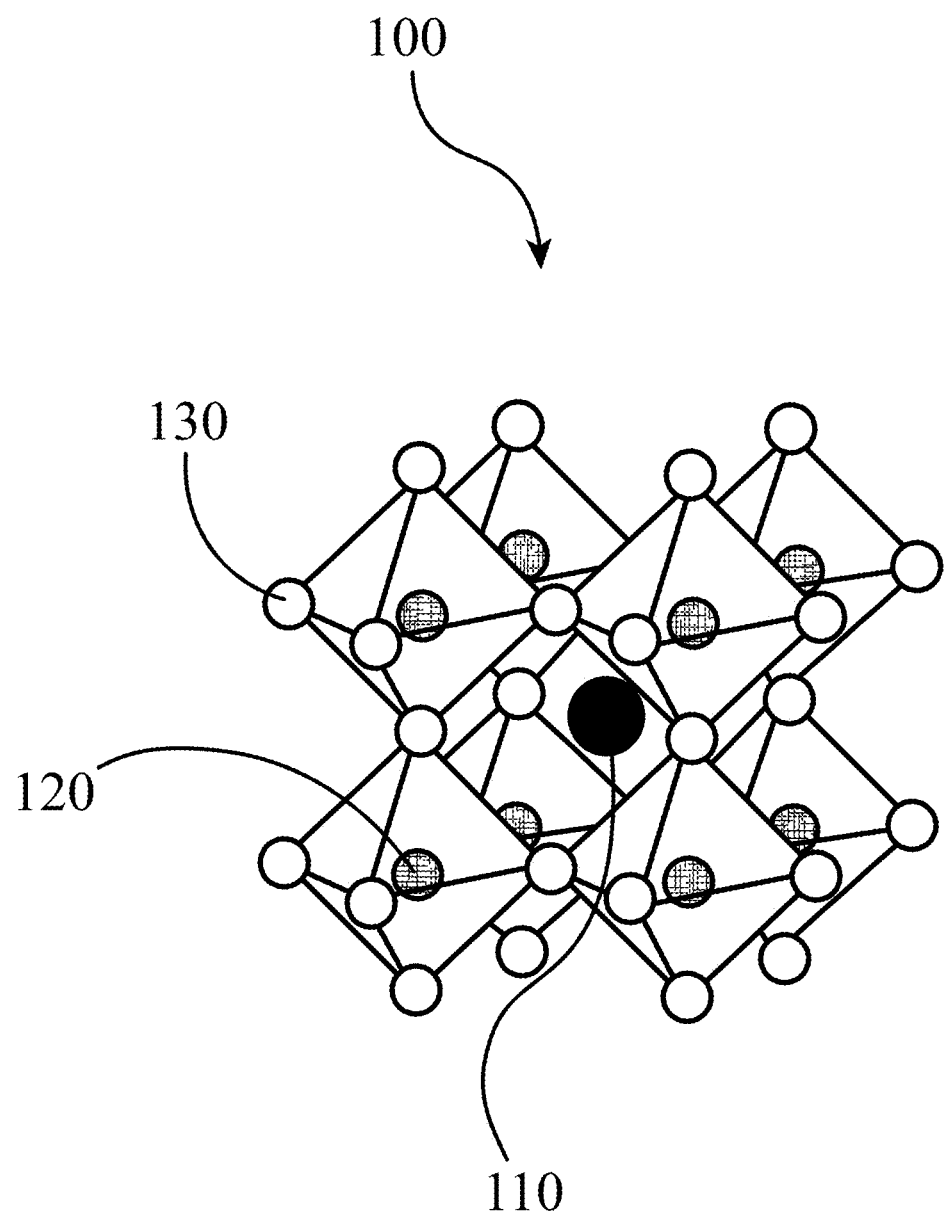
FIGS. 1A, 1B, and 1C illustrate the structure of a perovskite, according to some embodiments of the present disclosure.

100 . . . perovskite
110 . . . A-cation

120 . . . B-cation
130 . . . anion
200 . . . method
210 . . . combining
215 . . . mixture
220 . . . applying
225 . . . mixture on substrate
230 . . . treating

DETAILED DESCRIPTION

The embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The present application relates to scalable methods for producing perovskite materials, for example in full-scale manufacturing facilities using thin film coating techniques such as blade coating, slot die coating, roll-to-roll coating, and/or any other suitable solution processing methods. In some embodiments of the present disclosure, a precursor solution may be prepared that includes at least one solvent and the raw materials (perovskite precursors) needed to produce a targeted perovskite material. In some embodiments of the present disclosure, a precursor solution may also include at least one additive, where the additive performs at least one of adjusting the boiling point of at least one solvent and/or prevents precipitation of at least one of the raw materials. In some embodiments of the present disclosure, at least one of a solvent and/or an additive used in a precursor solution may be selected to have a specific boiling point or boiling point range and/or a specific vapor pressure or vapor pressure range. In some embodiments of the present disclosure, at least one of a solvent and/or an additive used in the precursor solution may have a boiling point less than 300° C. Note that as used herein, the term "additive" refers to a material that is added to a perovskite precursor solution to affect deposition of the solution on a substrate and/or perovskite crystal formation but where the material is not incorporated into the final solid perovskite itself, at least not substantially (e.g. at concentrations at or below the detection limits of the analytical methods used to test for the presence of the additive.)

Figure 1B:
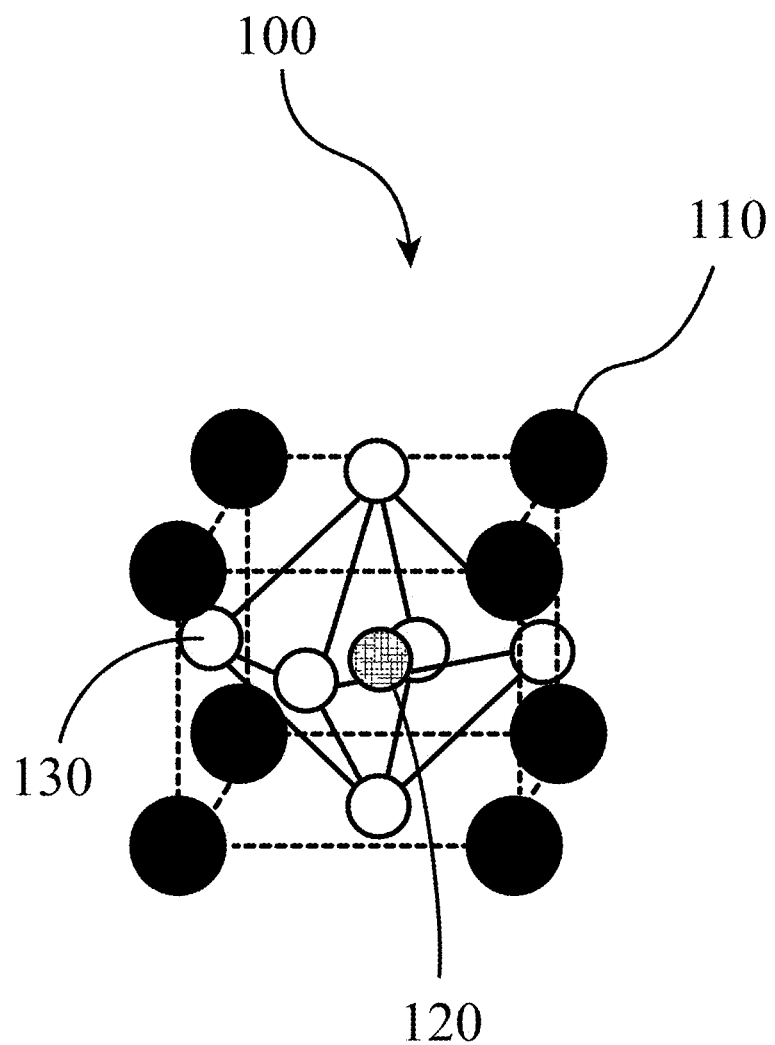
Figure 1C:
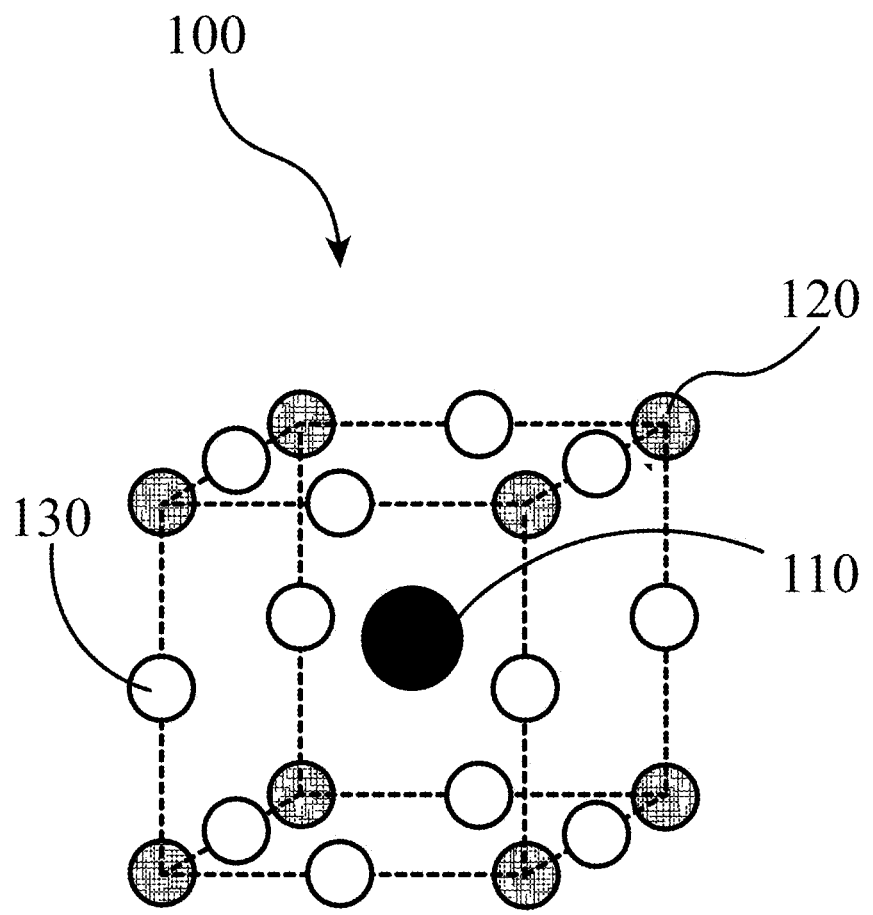

FIGS. 1A, 1B, and 1C illustrate that perovskites 100, for example halide perovskites, may organize into cubic crystalline structures with corner-sharing octahedra, as well as other crystalline structures such as tetragonal, hexagonal, and orthorhombic with either edge- or face-sharing octahedra, and may be described by the general formula $ABX_3$, where X (130) is an anion and A (110) and B (120) are cations, typically of different sizes (A typically larger than B). FIG. 1A illustrates that a perovskite 100 may be organized into eight octahedra surrounding a central A-cation 110, where each octahedra is formed by six X-anions 130 surrounding a central B-cation 120. FIG. 1B illustrates that a perovskite 100 may be visualized as a cubic unit cell, where the B-cation 120 is positioned at the center of the cube, an A-cation 110 is positioned at each corner of the cube, and an X-anion 130 is face-centered on each face of the cube. FIG. 1C illustrates that a perovskite 100 may also be visualized as a cubic unit cell, where the B-cation 120 resides at the eight corners of a cube, while the A-cation 110 is located at the center of the cube and with 12 X-anions centrally located between B-cations along each edge of the unit cell. For both unit cells illustrated in FIGS. 1B and 1C, the A-cations 110, the B-cations 120, and the X-anions 130 balance to the general formula $ABX_3$, after accounting for the fractions of each atom shared with neighboring unit cells. For example, referring to FIG. 1B, the single B-cation 120 atom is not shared with any of the neighboring unit cells. However, each of the six A-anions 130 is shared between two unit cells, and each of the eight A-cations 110 is shared between eight unit cells. So for the unit cell shown in FIG. 1B, the stoichiometry simplifies to B=1, A=8*0.124=1, and X=6*0.5=3, or $ABX_3$. Similarly, referring again to FIG. 1C, since the A-cation is centrally positioned, it is not shared with any of the unit cells neighbors. However, each of the 12 X-anions 130 is shared between four neighboring unit cells, and each of the eight B-cations 120 is shared between eight neighboring unit cells, resulting in A=1, B=8*0.125=1, and X=12*0.25=3, or $ABX_3$. Referring again to FIG. 1C, the X-anions 130 and the B-cations 120 are shown as aligned along an axis; e.g. where the angle at the X-anion 130 between two neighboring B-cations 120 is exactly 180 degrees, referred to herein as the tilt angle. However, a perovskite 100 may have may have a tilt angle not equal to 180 degrees. For example, some embodiments of the present disclosure may have a tilt angle between 153 and 180 degrees.

Typical inorganic perovskites include calcium titanium oxide (calcium titanate) minerals such as, for example, $CaTiO_3$ and $SrTiO_3$. In some embodiments of the present invention, the A-cation 110 may include a nitrogen-containing organic compound such as an alkyl ammonium compound. The B-cation 120 may include a metal and the X-anion 130 may include a halogen.

Additional examples for the A-cation 110 include organic cations and/or inorganic cations, for example Cs, Rb, K, Na, Li, and/or Fr. Organic A-cations 110 may be an alkyl ammonium cation, for example a $C_{1-20}$ alkyl ammonium cation, a $C_{1-6}$ alkyl ammonium cation, a $C_{2-6}$ alkyl ammonium cation, a $C_{1-5}$ alkyl ammonium cation, a $C_{1-4}$ alkyl ammonium cation, a $C_{1-3}$ alkyl ammonium cation, a $C_{1-2}$ alkyl ammonium cation, and/or a $C_1$ alkyl ammonium cation. Further examples of organic A-cations 110 include methylammonium ($CH_3NH_3^+$), ethylammonium ($CH_3CH_2NH_3^+$), propylammonium ($CH_3CH_2\ CH_2NH_3^+$), butylammonium ($CH_3CH_2\ CH_2\ CH_2NH_3^+$), formamidinium ($NH_2CH=NH_2^+$), hydrazinium, acetylammonium, dimethylammonium, imidazolium, guanidinium and/or any other suitable nitrogen-containing or organic compound. In other examples, an A-cation 110 may include an alkylamine. Thus, an A-cation 110 may include an organic component with one or more amine groups. For example, an A-cation 110 may be an alkyl diamine halide such as formamidinium ($CH(NH_2)_2$). Thus, the A-cation 110 may include an organic constituent in combination with a nitrogen constituent. In some cases, the organic constituent may be an alkyl group such as straight-chain or branched saturated hydrocarbon group having from 1 to 20 carbon atoms. In some embodiments, an alkyl group may have from 1 to 6 carbon atoms. Examples of alkyl groups include methyl ($C_1$), ethyl ($C_2$), n-propyl ($C_3$), isopropyl ($C_3$), n-butyl ($C_4$), tert-butyl ($C_4$), sec-butyl ($C_4$), iso-butyl ($C_4$), n-pentyl ($C_5$), 3-pentanyl ($C_5$), amyl ($C_5$), neopentyl ($C_5$), 3-methyl-2-butanyl ($C_5$), tertiary amyl ($C_5$), and n-hexyl ($C_6$). Additional examples of alkyl groups include n-heptyl ($C_7$), n-octyl ($C_8$) and the like.

Examples of metal B-cations 120 include, for example, lead, tin, germanium, and or any other 2+ valence state metal that can charge-balance the perovskite halide 100. Further examples include transition metals in the 2+ state such as Mn, Mg, Zn, Cd, and/or lanthanides such as Eu. B-cations may also include elements in the 3+ valence state, as described below, including for example, Bi, La, and/or Y. Examples for X-anions 130 include halogens: e.g. fluorine, chlorine, bromine, iodine and/or astatine. In some cases, the perovskite halide may include more than one X-anion 130, for example pairs of halogens; chlorine and iodine, bromine and iodine, and/or any other suitable pairing of halogens. In other cases, the perovskite halide 100 may include two or more halogens of fluorine, chlorine, bromine, iodine, and/or astatine.

Thus, the A-cation 110, the B-cations 120, and X-anion 130 may be selected within the general formula of $ABX_3$ to produce a wide variety of perovskite halides 100, including, for example, methylammonium lead triiodide ($CH_3NH_3PbI_3$), and mixed halide perovskites such as $CH_3NH_3PbI_{3-x}Cl_x$ and $CH_3NH_3PbI_{3-x}Br_x$. Thus, a perovskite halide 100 may have more than one halogen element, where the various halogen elements are present in non-integer quantities; e.g. x is not equal to 1, 2, or 3. In addition, perovskite halides, like other organic-inorganic perovskites, can form three-dimensional (3-D), two-dimensional (2-D), one-dimensional (1-D) or zero-dimensional (0-D) networks, possessing the same unit structure. As described herein, the A-cation 110 of a perovskite 100, may include one or more A-cations, for example, one or more of cesium, FA, MA, etc. Similarly, the B-cation 120 of a perovskite 100, may include one or more B-cations, for example, one or more of lead, tin, germanium, etc. Similarly, the anion 130 of a perovskite 100 may include one or more anions, for example, one or more halogens. Any combination is possible provided that the charges balance.

For example, a perovskite having the basic crystal structure illustrated in FIG. 1A, in at least one of a cubic, orthorhombic, and/or tetragonal structure, may have other compositions resulting from the combination of the cations having various valence states in addition to the 2+ state and/or 1+ state described above for lead and alkyl ammonium cations; e.g. compositions other than $AB^{2+}X_3$ (where A is one or more cations, or for a mixed perovskite where A is two or more cations). Thus, the methods described herein may be utilized to create novel mixed cation materials having the composition of a double perovskite (elpasolites), $A_2B^{1+}B^{3+}X_6$, with an example of such a composition being $Cs_2BiAgCl_6$ and $Cs_2CuBiI_6$. Another example of a composition covered within the scope of the present disclosure is described by $A_2B^{4+}X_6$, for example $Cs_2PbI_6$ and $Cs_2SnI_6$. Yet another example is described by $A_3B_2^{3+}X_9$, for example $Cs_3Sb_2I_9$. For each of these examples, A is one or more cations, or for a mixed perovskite, A is two or more cations.

In some embodiments of the present disclosure, as shown herein, precursor solutions that include an additive, where the additive is at least one of a ketone, an aldehyde, and or a non-nucleophilic sterically hindered base may be used to produce quality solid perovskite films, using methods suitable for full-scale manufacturing processes. Examples of suitable ketones include 4,4-dimethyl-2-pentanone, acetone, 2-heptanone, and 2,4-dimethyl-3-pentanone; examples of suitable aldehydes include acetaldehyde and benzaldehyde; and examples of non-nucleophilic sterically hindered bases include iisopropylethylamine (also known as Hunigs base), triethylamine, 2,6-di-t-butylpyridine, and 1,8-diazabicycloundec-7-ene. As demonstrated herein, some examples of precursor solutions may include methylammonium chloride. Such precursor solutions, as described herein, enable their deposition onto substrates by at least one of blade coating, slot-die coating, and/or any other suitable thin film deposition technique, resulting in the synthesis of high quality, stable, solid perovskite films, even when processed with and/or exposed to water. The resultant perovskite(s) may then be used in photovoltaic (PV) devices, light-emitting diodes (LEDs), and/or any other devices and/or systems that may benefit from a large area layer, $\geq 1$ $in^2$, of a perovskite. Thus, in some embodiments of the present disclosure, a precursor solution may include an amine-containing additive with examples including methylamine and/or diisopropylethylamine. In some embodiments of the present disclosure, an additive may result in at least one of adjusting the boiling point of the solvent, slowing the formation of the perovskite crystal, minimizing the formation of cracks in the perovskite crystal, and/or adjusting the solubility limit of the perovskite precursor, resulting in a better quality and/or better performing perovskite film. Note that in some embodiments of the present disclosure, a first amine may be utilized as a solvent, while a second amine may be used as an additive.

The term "single step" refers to a method that provides all of the required perovskite starting materials to achieve the targeted perovskite composition in a single solution, whereas the term "more than one step" (e.g. two step) refers to a method where the perovskite starting materials are divided into two or more parts and sequentially deposited in the process, in two or more processing steps, to form the targeted perovskite. Experiments performed by blade coating large areas (≥1 in²) with a perovskite precursor solution resulted in solid films exhibiting two main failures: 1) irregular drying patterns resulting in surface roughness, pin holes, and/or possible inhomogeneity; and 2) wide spread cracks causing large short circuit pathways and drastically reduced device performances. Thus, different precursor solutions (i.e. mixtures) for forming improved perovskite layers were investigated and are described herein.

In some embodiments of the present disclosure, a precursor solution may be characterized as a volatile solvent mixture, which may include methylamine as an additive and/or solvent dissolved in a solvent such as acetonitrile. In addition, a precursor solution (i.e. mixture) contains the perovskite precursors needed to provide the elements needed to produce the targeted solid perovskite material; e.g. methylammonium iodide (MAI), cesium iodide (CsI), and lead iodide ($PbI_2$), to produce a mixed A-cation (e.g. cesium, FA, and/or MA) lead triiodide perovskite material ($FA_xMA_y$ $Cs_{(1-x-y)}PbI_3$, where 0≤x≤1 and 0≤y≤1). In some embodiments of the present disclosure, the concentration of methylamine, relative to the solvent, may be between 0% v/v and the saturation limit of methylamine in the solvent. In some embodiments of the present disclosure, the concentration of methylamine, relative to the solvent, may be between 5% v/v and 25% v/v. As shown herein, methylamine can minimize defects in crystalline perovskite films and may decrease surface roughness and reduce pinhole concentrations in the perovskite films, thus providing additive-like benefits. The irregular drying patterns observed in the initial sutides were attributed to the large difference in boiling points between the methylamine and acetonitrile, while the cracking was likely a result of the high volatility of the solvent. Thus, subsequent efforts focused on evaluating the affects of solvents to both minimize the boiling point difference and decrease the overall solvent volatility. Numerous solvents were tested in various ratios with additives. Aprotic solvents tested herein included at least one of acetonitrile, benzonitrile, dimethylacetate, propylamine, propylene carbonate, triethylamine, and/or valeronitrile.

In most cases, when the solvent was adjusted, the resulting film suffered from one of several problems including occluded or trapped solvent molecules, solvent incorporation into the crystal structure, unwanted side reactions involving the solvent with other components in the mixture, and/or poor precursor solubility. Due to the almost limitless number of solvents and solvent ratios possible it was determined that a more practical approach was to investigate the use of additives to slow both crystallization and solvent evaporation. This resulted in the discovery that formadinium iodide (FA) can drastically slow film formation. When a molar ratio of 0.10:1:1.1 ($FA:MAI:PbI_2$) was used, the observable film cracking was almost completely eliminated. When ratios greater than 0.1:1 (FA:MAI) were used, the film formation was slowed to a greater extent with the added benefit that the irregular drying patterns were greatly diminished. Suitable solvents for the methods described herein include aprotic solvents, with examples including at least one of acetonitrile, N-methylpyrrolidone, tetrahydrofuran, ethyl acetate, acetone, dimethylformamide, and/or dimethyl sulfoxide.

Without wishing to be bound by theory, a possible explanation for this observation is that the FA induces a boiling point elevation of the methylamine solvent thereby decreasing the difference in boiling points between the two solvents and thus resulting in a more homogeneous film. However, this possible interaction and/or possible chemical reactions between the FA and methylamine decreased the overall device performance. This diminished performance is most likely a result of side reactions between the methylamine and FA resulting in unwanted compounds being incorporated into the perovskite structure. To weaken or inhibit this interaction or possible chemical reactions between the FA and methylamine, a ketone was provided in the precursor solution as an additive. Without wishing to be bound by theory, it is hypothesized that the ketone may form a weak dipole interaction with the methylamine additive and/or form an intermediate imine with methylamine, possibly resulting in effectively raising the methylamine's boiling point.

To inhibit the formation of quaternary ammonium salts, a base additive (Hünigs base-diisopropylethylamine) was used in addition to the ketone additive. However, addition of greater than 2% v/v (volume basis relative to the solvent(s) used in the mixture) of these additives resulted in precursor precipitation. As shown herein, the addition of 0.05 molar ratio of MACl (another additive) to MAI can inhibit precursor precipitation. In some embodiments of the present disclosure, the molar ratio of MACl to MAI (MACl:MAI), to inhibit precursor precipitation, may be between greater than zero:1 and equal to 2:0. In some embodiments of the present disclosure, the molar ratio of MACl to MAI (MACl:MAI), to inhibit precursor precipitation, may be between 0.02:1.0 and 1.0:1.0. Some additives tested in the work described herein include methylethyl ketone, acetone, 3-pentanone, toluene, chlorobenzene, and/or ethylene glycol. Various bases were tested in precursor solutions, in addition to diisopropylamine, including at least one of t-butylamine, n-butylamine, dibutylamine, morpholine, N-methylmorpholine, triphenylphosphine, and/or t-butyl pyridine.

In some embodiments of the present disclosure, regarding perovskite precursor concentrations, the concentration of $PbI_2$ provided in a mixture may be in a range between 0.01 moles of $PbI_2$ per liter of solvent and 10 moles of $PbI_2$ per liter of solvent. In some embodiments of the present disclosure, the concentration of $PbI_2$ provided in a mixture may be in a range between 0.1 moles of $PbI_2$ per liter of solvent and 4.0 moles of $PbI_2$ per liter of solvent. The remaining precursor concentrations may be defined accordingly, relative to the $PbI_2$ concentration, to obtain the stoichiometry needed to obtain a specific final perovskite formulation.

Blade coating this new perovskite precursor solution (i.e. mixture) containing the aforementioned additives resulted in crack free films without irregular drying patterns or hazing. This precursor solution was used to produce perovskite films on substrates having width and length dimension between 1 inch by 1 inch and 6 inches by 6 inches. This precursor solution was also applied using roll-to-roll processing onto substrates 6 inches by 50 feet. In addition, the resulting films were largely defect free and very homogeneous.

Figure 10:
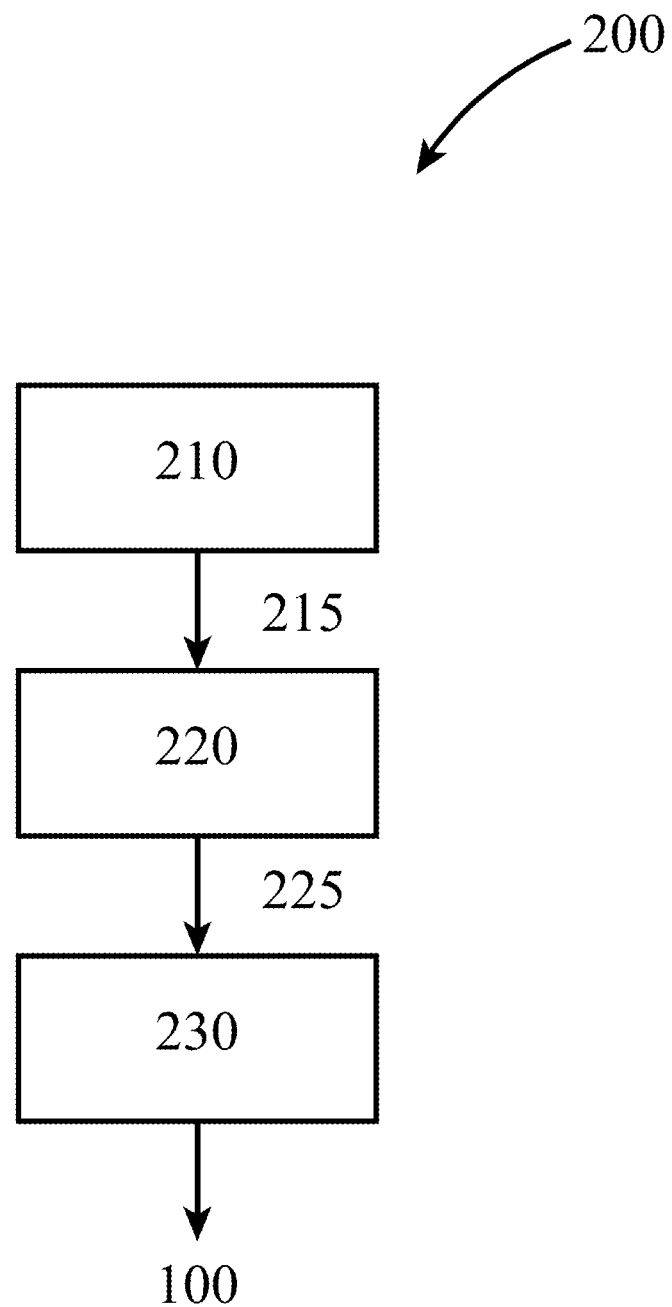
FIG. 10 illustrates a method for making perovskite materials using mixtures described herein, according to some embodiments of the present disclosure.

In some embodiments of the present disclosure, a precursor solution may be applied to a substrate by any suitable solution processing method for example, spin coating, blade coating, slot-die coating, gravure, aerosol, inkjet printing, etc. In some embodiments of the present disclosure, the precursor solution may be applied at temperature between 0° C. and 300° C. As shown herein, the precursor solutions described above may contain saturated water and/or free water (present as a second liquid phase in the mixture) and/or deposited on substrates in high humidity atmospheres without impacting the processability of the precursor solution or the performance and stability of the resulting perovskite layers. In some embodiments of the present disclosure, a precursor solution, as described herein, may be applied in atmospheric conditions having a relative humidity between 0% and 100%. The precursor solution may be thermally treated in a subsequent step, to produce the targeted solid perovskite film, by heating the precursor solution to a temperature between 50° C. and 300° C. for a period of time between 30 seconds and 10 hours. In some embodiments of the present disclosure, the precursor solution may be thermally treated at a temperature between 100° C. and 150° C. for a period of time between one minute and one hour. The thermal treating may result in essentially complete evaporation of the solvent and all of the additives. A system and/or method that further describes how the mixtures described herein may be used to manufacture perovskite films at a manufacturing scale is illustrated in FIG. 10 and described in its accompanying language.

Figure 2:
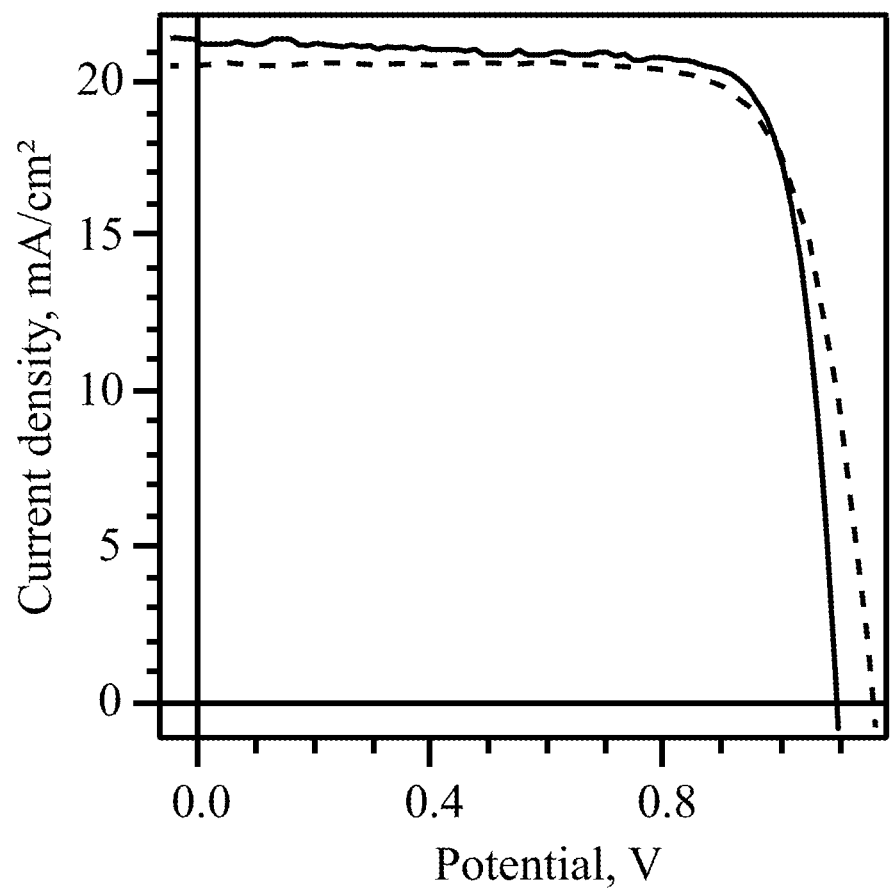
FIG. 2 illustrates a JV plot of n-i-p (dashed line) and p-i-n (solid line) small area (0.059 cm²) devices fabricated using a perovskite precursor solution (i.e. mixture) containing additives, according to some embodiments of the present disclosure.

FIG. 2 illustrates a JV plot of n-i-p (dashed line) and p-i-n (solid line) device architectures of small area (0.059 cm$^2$) devices fabricated using a perovskite precursor solution containing additives, according to some embodiments as described herein. The precursor solution used to manufacture both devices was a solvent mixture of 10% v/v methylamine (solvent #1) in 90% acetonitrile (solvent #2), and two additives, 1% v/v 4,4-dimethyl-2-pentanone (additive #1), and 0.5% v/v diisopropylethylamine (additive #2), where the additive concentrations are relative to the solvent; e.g. 10% v/v is equivalent to 10 ml of additive combined with 90 ml of solvent. Although the ketone (4,4-dimethyl-2-pentanone) used in this example was at about 1% v/v %, the concentration of a ketone in mixtures as described herein may be varied between 0.1 v/v % and 20 v/v %, inclusively. Similarly, although the base used in this example (diisopropylethylamine) was at a concentration of about 0.5 v/v %, the concentration of a base in mixtures as described herein may be varied between 0.01 v/v % and 10 v/v %, inclusively. The perovskite precursor salt ratio included $MA_{(1.00)}FA_{(0.10)}PbI_{2(1.20)}MACl_{(0.20)}$, where the numbers in the parenthesis are the molar ratios of each of species provided in the starting solution; e.g. so for every mole MAI, 1.20 mols $PbI_2$ were included in the solution, etc. For this example, as a result, the ratio of MA+FA to $PbI_2$ was targeted at about 1:1.1. The final target perovskite composition from this particular starting solution was $MA_{(1.00)}FA_{(0.10)}PbI_{3(1.2)}$ achieving a final solid perovskite film thickness of approximately 500 nm. The significance of the two different architectures is that this exemplary mixture can be deposited on different materials and resulted in equivalent device performances. The architecture of the n-i-p device was glass, ITO, $SnO_2$, perovskite, spiro-MeOTAD, $MoO_x$, Ag. The architecture of the p-i-n device was glass, ITO, PTAA, perovskite, $C_{60}$, BCP, Ag. In both cases the perovskite precursor mixture was blade coated at room temperature in ambient conditions at a relative humidity between 30 to 40%. The perovskite in both architectures was annealed at 130° C. in ambient conditions for about 3 minutes.

Figure 3:
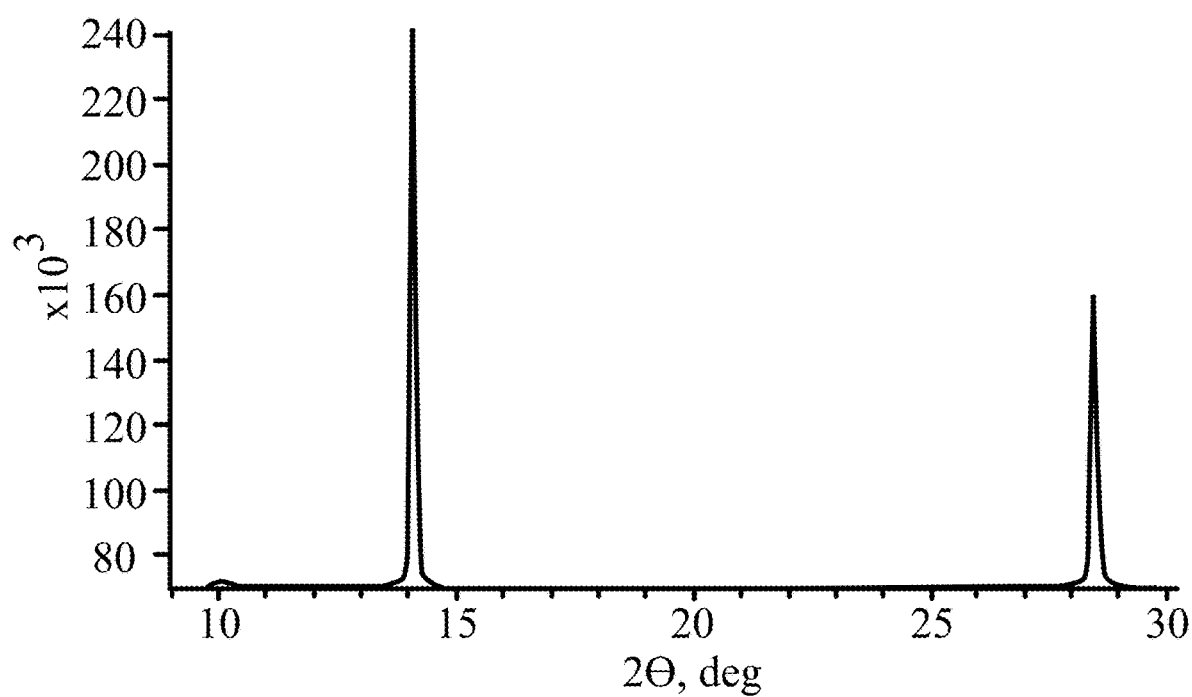
FIG. 3 illustrates XRD spectrum of a $MA_{0.9}FA_{0.1}PbI_3$ slot-die coated film deposited from a precursor solution (i.e. mixture) containing additives, according to some embodiments of the present disclosure.

FIG. 3 illustrates an XRD spectrum of a $MA_{(1.00)}FA_{(0.10)}PbI_{3(1.20)}$ slot-die coated film deposited from a precursor solution containing additives. This figure shows that the final crystalline film is the expected composition. This film was blade coated on glass in ambient conditions with the relative humidity between 30-40% followed by thermal annealing in air at 130° C. for 3 minutes to help remove solvents and MACl. The perovskite precursor salt included $MA_{(1.00)}FA_{(0.10)}PbI_{2(1.20)}MACl_{(0.20)}$ and was dissolved in a precursor solution containing 10% v/v of methylamine in acetonitrile with the additives 1.0% v/v 4,4-dimethyl-2-pentanone, and 0.5% diisopropylethylamine, relative to the total solvent.

Figure 4:
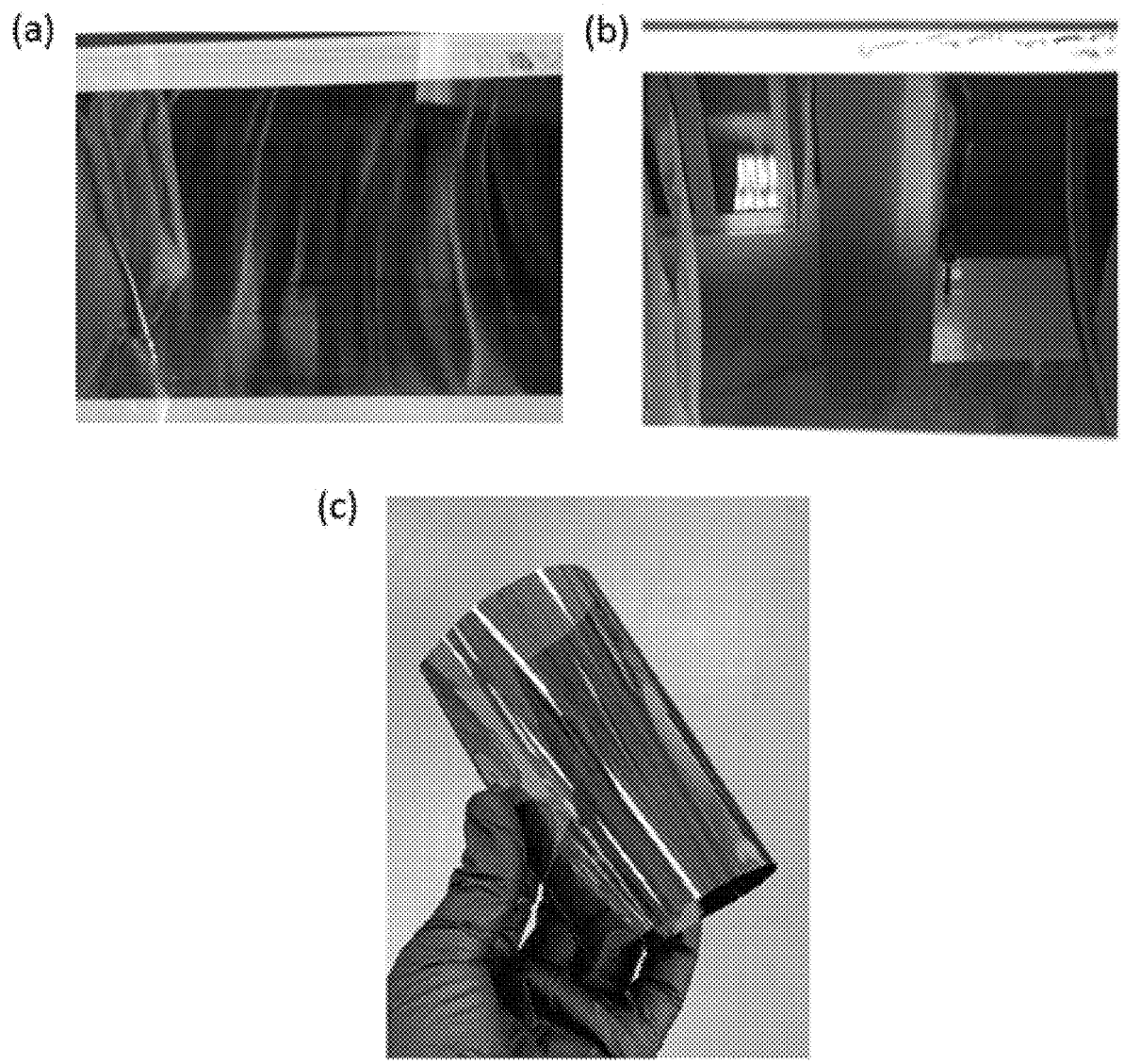
FIG. 4 illustrates photographs of perovskite films applied to a glass substrate by a "one-step" slot-die coating process, according to some embodiments of the present disclosure.

Panels (a) and (b) of FIG. 4 illustrates photographs of perovskite films applied to a glass substrate by a "one-step" slot-die coating process, according to some embodiments of the present disclosure. Panel (a) of FIG. 4 shows numerous white drying lines. The white lines are undesirable and lead to diminished module/device performance. Panel (b) shows the improved film resulting from the use of additives; note how the much smoother surface results in the visible reflection of the surroundings. In addition, this precursor can be deposited on plastic, for example biaxially oriented polyethylene napthalate (BOPEN) and/or other flexible substrates, as shown in Panel (c) of FIG. 4. The top two films were coated via slot-die while the bottom film was blade coated. Although only slot-die and blade coating were used in these experiments, other solution processing methods are considered within the scope of the present disclosure. Other flexible substrates that may be used include biaxially oriented polyethylene terephthalate (BOPET), polyimide (for example Kapton®), polyvinylfluoride (for example Tedlar®), and/or flexible glass. The perovskite precursor mixture used to produce the perovskite shown in Panel (a) of FIG. 4 included the perovskite percursors to target a stoichiometry of $MA_{(1.00)}FA_{(0.10)}PbI_{2(1.20)}MACl_{(0.20)}$, which were dissolved in a solvent mixture of 10% v/v methylamine, with the remainder being acetonitrile. Thi mixture was slot-die roll-to-roll coated on $SnO_2$ coated flexible glass in ambient conditions with a relative humidity between 30-40% followed by thermal annealing by forced air drying at 100° C. for 2 min. The perovskite precursor mixture used to produce the perovskite shown in Panel (b) of FIG. 4 included the perovskite precursors needed to target a stoichiometry of $MA_{(1.00)}FA_{(0.10)}PbI_{2(1.20)}MACl_{(0.20)}$, dissolved in a solution of 10% v/v of methylamine with the remainder being acetonitrile. In addition, the mixture contained additives, 1.0% v/v 4,4-dimethyl-2-pentanone, and 0.5% diisopropylethylamine and was slot-die roll-to-roll coated on a $SnO_2$ coated flexible glass substrate in ambient conditions with a relative humidity between 30-40% followed by thermal annealing by forced air drying at 100° C. for 2 minutes. The perovskite precursor solution used to produce the perovskite film shown in Panel (c) of FIG. 4 was identical to that used for the film shown in Panel (c) of FIG. 4 was blade coated on a BOPEN substrate in ambient conditions with a relative humidity between 30-40% followed by thermal annealing on a hot plate at 130° C.

Figure 5:
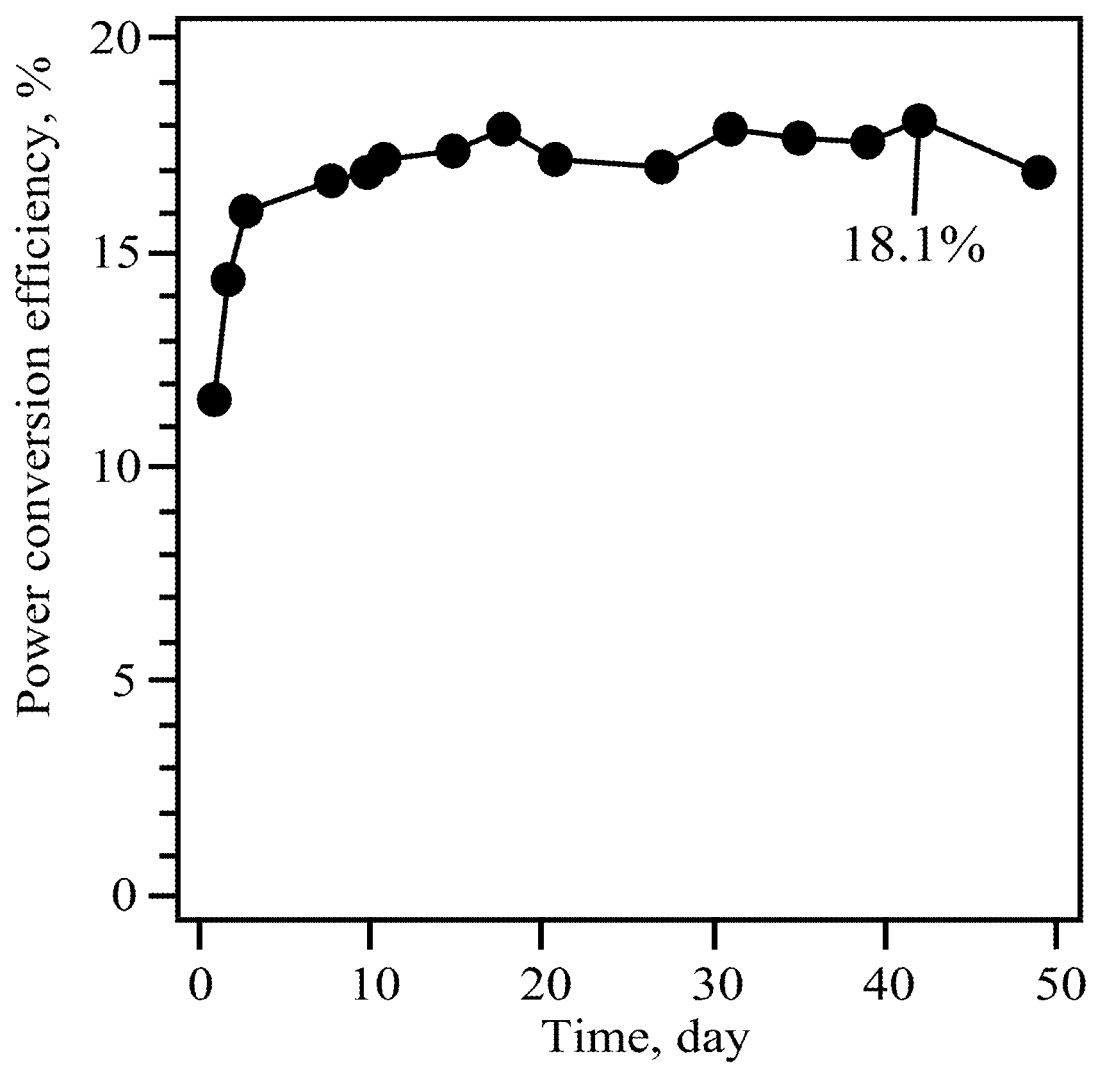
FIG. 5 illustrates the shelf-life of a completed and unencapsulated device fabricated from a novel precursor, according to some embodiments of the present disclosure.

FIG. 5 illustrates the shelf-life of a completed and unencapsulated perovskite-containing device fabricated from a precursor solution, according to some embodiments of the present disclosure. The device was stored in a nitrogen glove box and periodically measured. FIG. 5 illustrates that this device was stable for over a month. The device architecture was glass/ITO/$SnO_2$/perovskite/Spiro-MeOTAD/$MoO_x$/Ag. The perovskite precursor mixture included the perovskite precursors needed to target a perovskite stoichiometry of $MA_{(1.00)}FA_{(0.10)}PbI_{2(1.20)}MACl_{(0.20)}$ and was dissolved in a solvent mixture of 10% v/v of methylamine in acetonitrile, and also contained 1.0% v/v 4,4-dimethyl-2-pentanone, and 0.5% diisopropylethylamine. The perovskite film was blade coated in ambient conditions at a relative humidity between 30-40% followed by thermal annealing (e.g. thermal treating) in air at 130° C. for 3 minutes to help remove solvents and MACl. For this example, the target thickness of the perovskite layer was 500 nm. In some embodiments of the present disclosure, the thickness may be between 10 nm and 2000 nm.

Figure 6:
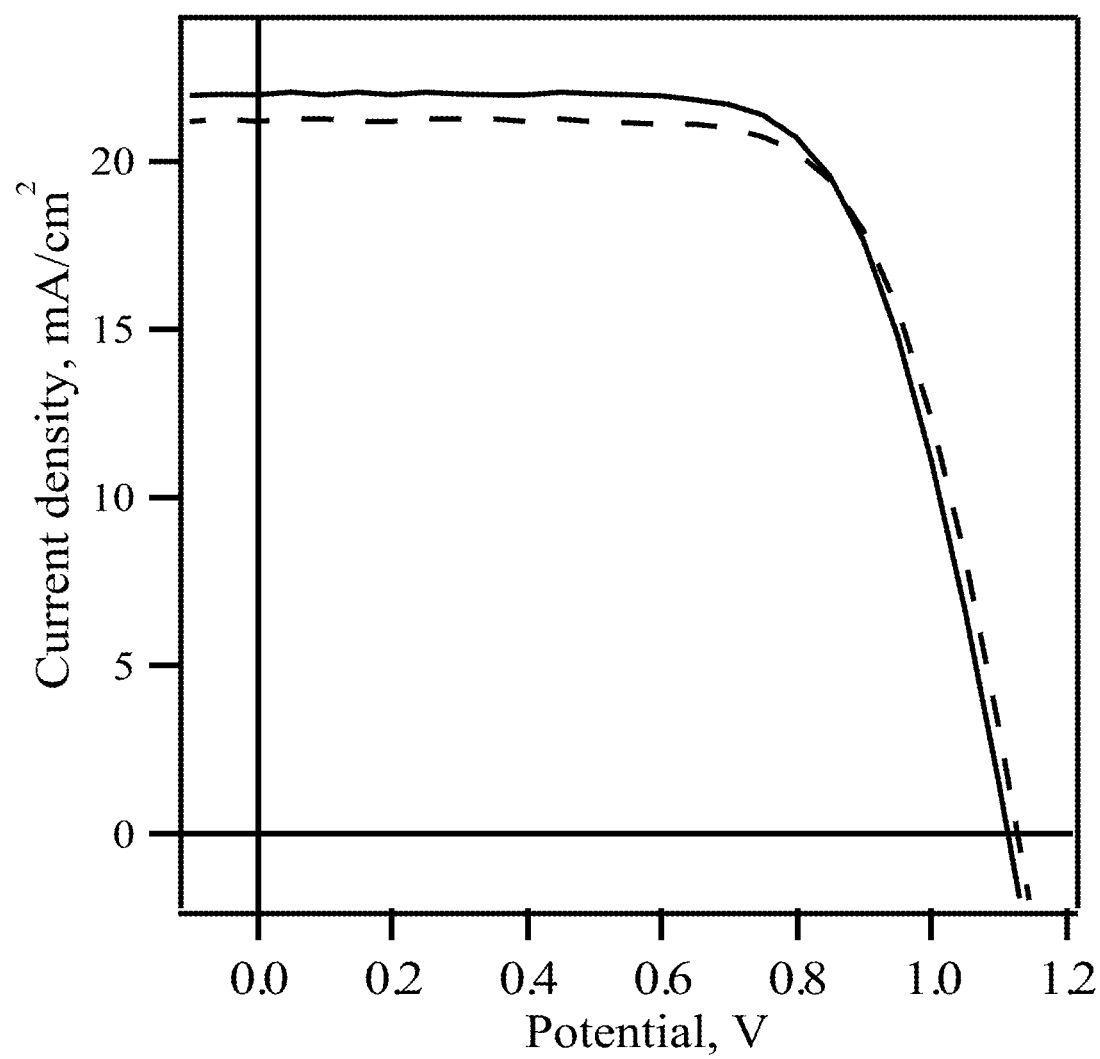
FIG. 6 illustrates JV curves of devices fabricated with exposure to water (dashed line) and without exposure to water (solid line), according to some embodiments of the present disclosure.

FIG. 6 illustrates JV curves of devices fabricated with exposure to water (dashed line) and without exposure to water (solid line), according to some embodiments of the present disclosure. The PCE's measure for the device with water exposure was about 16.47% and for the device without water exposure was about 16.54%. Typically, perovskite fabrication is very sensitive to the relative humidity of the coating atmosphere and strict control must be maintained during deposition and annealing of perovskite active layers. This figure shows the JV curves of two different devices fabricated in ambient conditions from the same novel precursor mixture with the exception that the dashed JV curve was produced from a device that contained 1% v/v of deionized water intentionally added directly to the precursor solution, while the solid line was from a device fabricated without adding water to the perovskite precursor mixture. Both devices included glass/ITO/SnO$_2$/perovskite/Spiro-MeOTAD/MoO$_x$/Ag. The perovskite precursor solution used to produce both devices included MA$_{(1.00)}$FA$_{(0.10)}$PbI$_{2(1.20)}$MACl$_{(0.20)}$. This precursor included 10% v/v of methylamine in acetonitrile with 1.0% v/v 4,4-dimethyl-2-pentanone, and 0.5% diisopropylethylamine; however, for the device with added water, 1% v/v of deionized water was added directly to the precursor solvent. Both perovskite films were blade coated in ambient conditions with a relative humidity between 30-40% followed by thermal annealing in air at 130° C. for 3 minutes. Both devices were blade coated using the same parameters and same targeted thickness of 500 nm. Surprisingly, FIG. 6 illustrates that the perovskite precursor mixtures described herein are water tolerant. This water tolerance could allow for less stringent coating environments, essentially widening the processing condition window and potentially allowing for the fabrication of high-performance perovskite devices in a wide range of humidity levels, for example, up to and/or exceeding 80% relative humidity.

Figure 7:
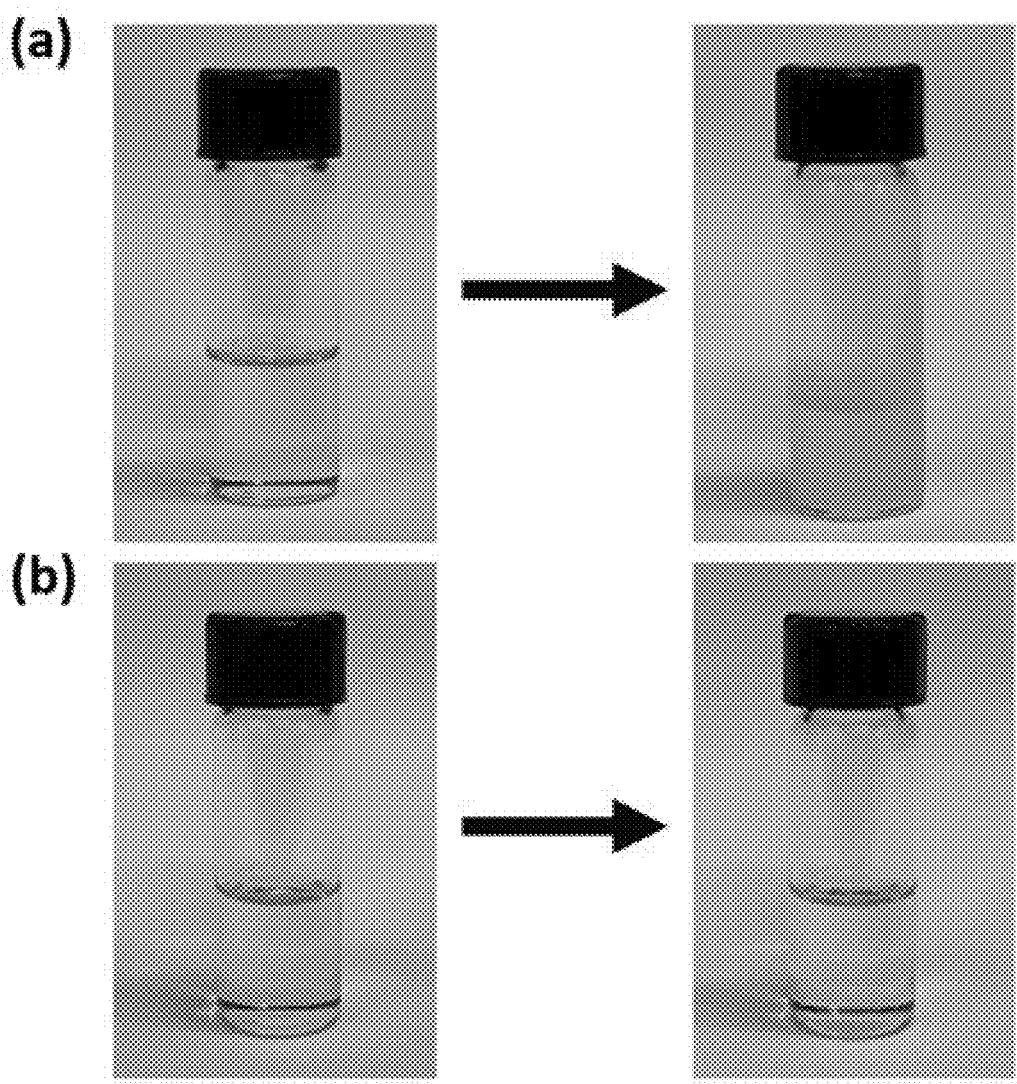
FIG. 7 illustrates photographs of solutions that have been aged in ambient conditions for 3 weeks, according to some embodiments of the present disclosure.

FIG. 7 illustrates photographs of precursor mixtures that have been aged in ambient conditions for three weeks, according to some embodiments of the present disclosure. When newly made (e.g. at time equal to zero), both starting vials, the left hand photographs of Panels (a) and (b) were visually identical; they were the same color and did not contain any precipitates. Both starting vials were compositionally identical with the perovskite precursor solution including the precursors needed to target a stoichiometry of MA$_{(1.00)}$FA$_{(0.10)}$PbI$_{2(1.20)}$MACl$_{(0.20)}$. The solvent in the starting vial shown in Panel (a) included only solvents (e.g. no additives) 10% v/v methylamine in acetonitrile, while the solvent in the starting vial shown in Panel (b) contained the same solvent mixture, but also contained two additives, 1% v/v 4,4-dimethyl-2-pentanone, 0.5% v/v diisopropylethylamine. After 3 weeks, the final vial (right side) of Panel (a) contained precipitate while the final vial (right side) of Panel (b) did not. Furthermore, equivalent device performance could be obtained when devices were made from a starting solution of the composition contained in the vial of Panel (b), as well as an aged solution of the composition contained in the vial of Panel (b). This shows that the use of the precursor additives described herein result in better performing devices and provide more flexibility in raw material storage in a manufacturing plant environment. In addition, the improved precursor solution stability is advantageous for long or continuous production runs that may last from several hours to many days. This also allows for the preparation of larger amounts of ink that will minimize variability between experiments or production runs by eliminating the inherent variation of the amounts of raw materials used.

Figure 8A:
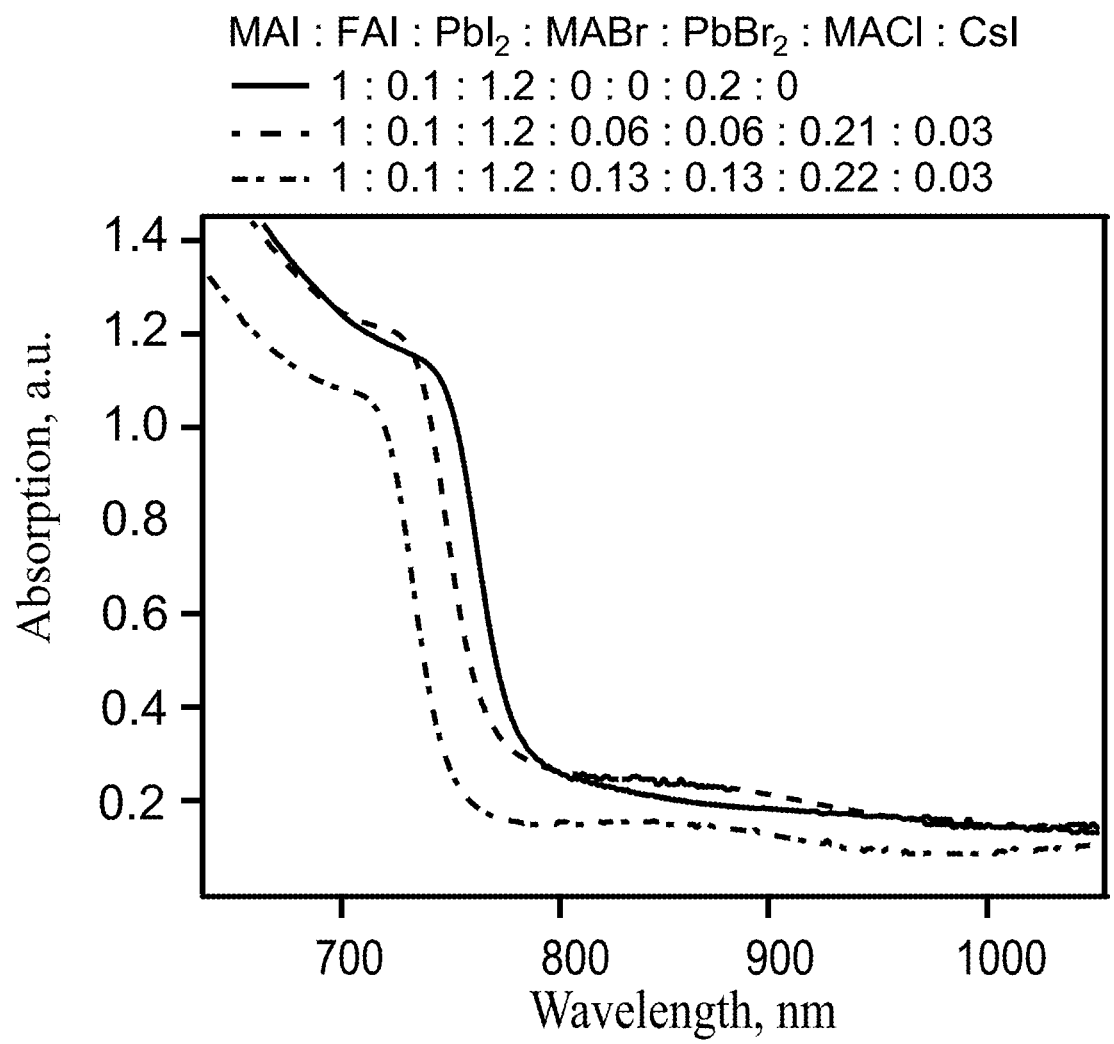
FIG. 8A illustrates the UV-vis absorption spectra of three different lead mixed halide perovskite films, according to some embodiments of the present disclosure.
Figure 8B:
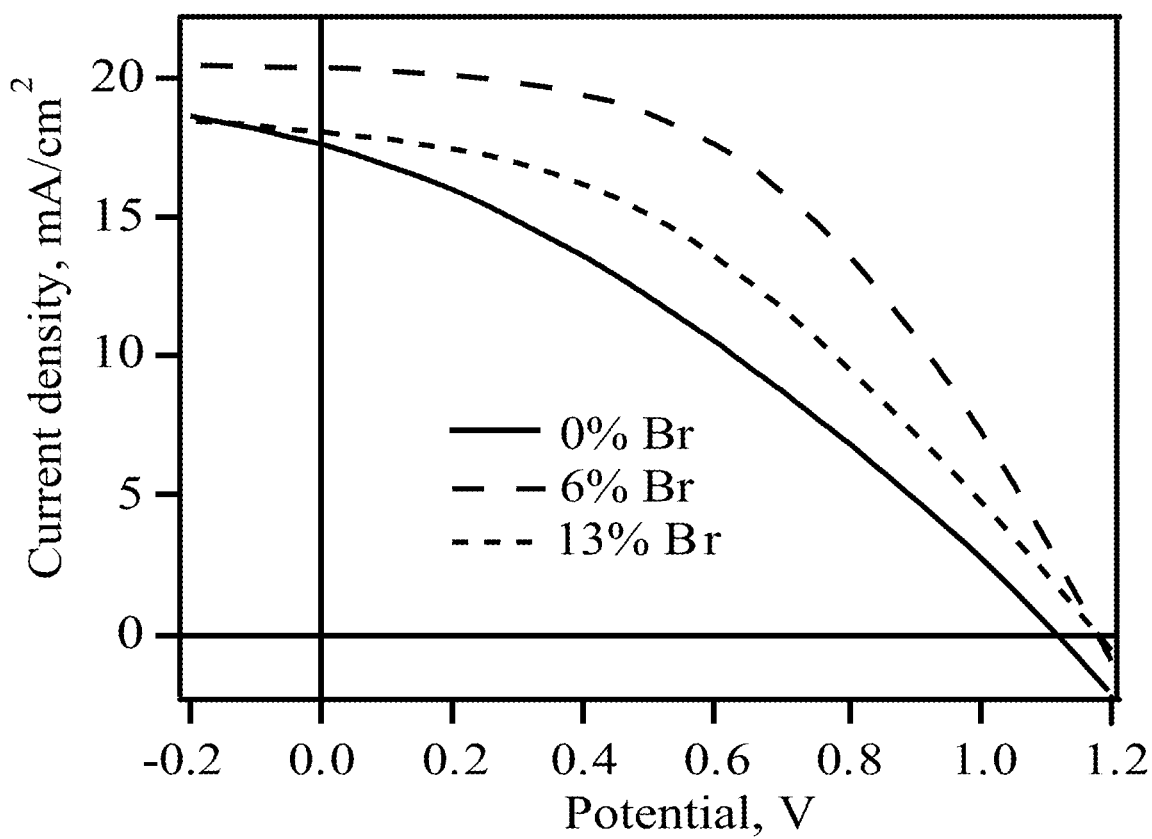
FIG. 8B illustrates the preliminary JV curves of solar cells containing different amount of perovskite composition corresponding those in FIG. 8A, according to some embodiments of the present disclosure.

FIG. 8A illustrates the UV-vis absorption spectra of perovskite films synthesized according to some embodiments of the present disclosure. Specifically, FIG. 8A illustrates the UV-vis absorption spectra of three different lead mixed halide perovskite films deposited from three different solution precursors containing at least some of the additives described herein. These films were blade coated onto glass substrates in ambient conditions at a relative humidity between 30-40% using identical blade coating parameters, with each film annealed at 130° C. on a hot plate, also at ambient conditions. The precursor solution for all three films was identical and included 10% v/v methylamine in acetonitrile, 1% v/v 4,4-dimethyl-2-pentanone, 0.5% v/v diisopropylethylamine. The perovskite salt ratios were as follows: (solid line) MAI$_{(1.00)}$ FAI$_{(0.10)}$ PbI$_{2(1.20)}$, (long dash) MAI$_{(1.00)}$ FAI$_{(0.10)}$ PbI$_{2(1.20)}$ MABr$_{(0.06)}$ PbBr$_{2(0.06)}$ CsI$_{(0.03)}$, and (dash-dot) MAI$_{(1.00)}$ FAI$_{(0.10)}$ PbI$_{2(1.20)}$ MABr$_{(0.13)}$ PbBr$_{2(0.13)}$ CsI$_{(0.03)}$. FIG. 8A indicates that various salts may be dissolved into precursor solutions as described herein and incorporated into the resulting perovskite films. This is significant because the use of mixed halide perovskites can be used to tune the band gap and has been shown to improve device stability. Thus, perovskites that may be made according to the methods described herein may include an perovskite having the following composition, MA$_{1-x-y}$FA$_x$Cs$_y$Pb(I$_{1-a-b}$Br$_a$Cl$_b$)$_3$, where each of x, y, a, and b are between greater than or equal to zero and less than or equal to one. FIG. 8B illustrates the preliminary JV curves of solar cells containing different perovskite film compositions corresponding those in FIG. 8A. The architectures of all three devices were identical and included glass/ITO/SnO$_2$/perovskite/Spiro-MeOTAD/MoO$_x$/Ag. The perovskite active layer in all three devices was blade coated in ambient conditions at a relative humidity between 30-40% using identical blade coating parameters and annealed at 130° C. on a hot plate in ambient conditions.

The target thickness of the perovskite layer was 500 nm. The precursor solution for all three films was identical, with each including 10% v/v methylamine in acetonitrile, 1% v/v 4,4-dimethyl-2-pentanone, 0.5% v/v diisopropylethylamine. The perovskite salt ratios were as follows: (solid line) MAI$_{(1.00)}$ FAI$_{(0.10)}$ PbI$_{2(1.20)}$, (long dash) MAI$_{(1.00)}$ FAI$_{(0.10)}$ PbI$_{2(1.20)}$ MABr$_{(0.06)}$ PbBr$_{2(0.06)}$ CsI$_{(0.03)}$, and (short dash) MAI$_{(1.00)}$ FAI$_{(0.10)}$ PbI$_{2(1.20)}$ MABr$_{(0.13)}$ PbBr$_{2(0.13)}$ CsI$_{(0.03)}$.

Figure 9:
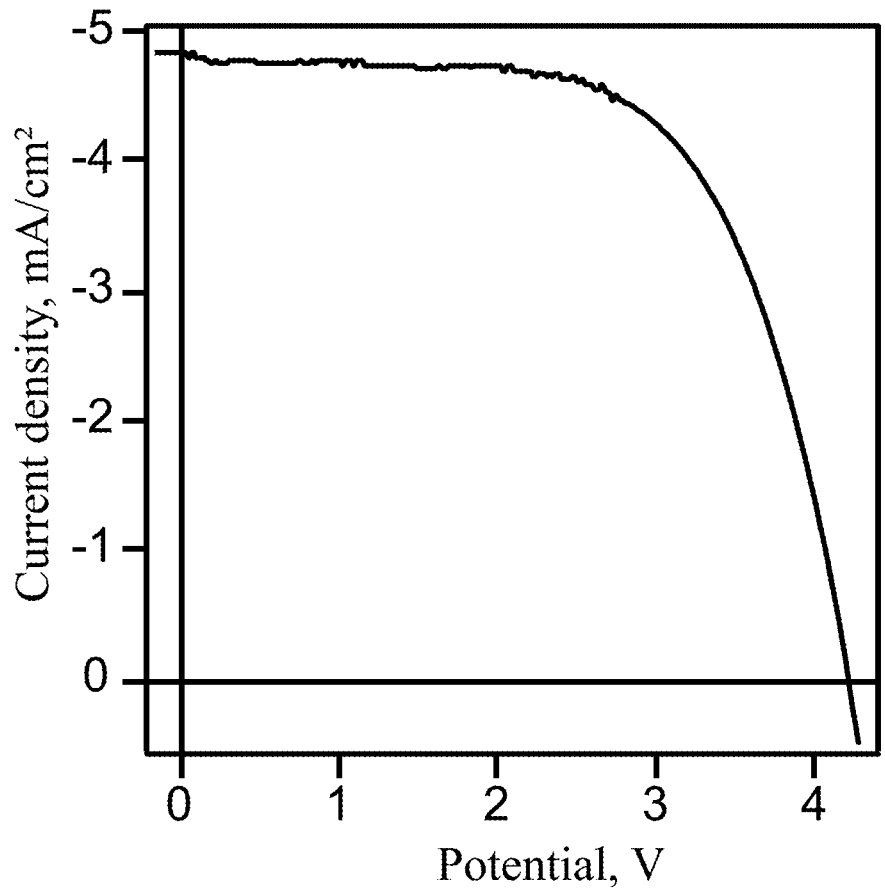
FIG. 9 illustrates the JV curve of a ~7 cm² 4-cell monolithically interconnected mini-module, according to some embodiments of the present disclosure.

FIG. 9 illustrates the JV curve of a ~7 cm$^2$ 4-cell monolithically interconnected mini-module containing a perovskite active layer deposited from precursor solutions containing the additives described herein. The overall power conversion efficiency (PCE) of this mini-module was 12.9%. The average V$_{oc}$ of each cell was 1.05 V and the J$_{sc}$ of the active area (corrected for geometric fill factor) was 21.5 mA/cm$^2$. These metrics are comparable to the high-performance small-scale devices shown in FIG. 2. This is significant because it shows that the precursor solutions described herein can be deposited at larger scales (>1 cm$^2$) without sacrificing the V$_{oc}$ or J$_{sc}$.

FIG. 10 illustrates a method 200 for making perovskite materials, using examples of the mixtures described herein, according to some embodiments of the present disclosure. In some embodiments of the present disclosure, the method 200 may include combining 210 a perovskite precursor, a solvent, and an additive to form a mixture 215, 220 applying the mixture 215 to a substrate, resulting in the mixture on the substrate 225, and 230 treating the mixture on the substrate 225, where the treating results in the removing of at least a portion of the solvent and the additive and the forming of a perovskite 100. In some embodiments of the present disclosure, at least one of the mixing 210, the applying 220, and/or the treating 230 may be performed in an environment having a relative humidity between 0% and 100%. In some embodiments of the present disclosure, the relative humidity may be between about 30% and 40%. In some embodiments of the present disclosure, the mixture may further include water. Additional details of exemplary methods for producing mixtures and perovskite films are described elsewhere in this disclosure.

EXPERIMENTAL

Perovskite precursor preparation: All reagents were used as received unless otherwise stated. The methylammonium iodide, formamidinium iodide, lead iodide, methylammonium bromide, lead bromide, and methylammonium chloride were all measured out in the appropriate amounts and combined in a glove box with the water and oxygen levels kept below 1 ppm. The combined solids were then transferred out of the glove box and a solution of 10% v/v of methylamine in acetonitrile was then added; the methylamine was added as a liquid to degassed acetonitrile. The concentration of the final solution was kept at 2.00 M (this was calculated as the total amounts of solids divided by the volume of solvent added so actual molarity will be lower due to the volume of solids not being taken into account). This solution was then vortexed and sonicated until all solids dissolved, about 5 min. This solution can be kept in a sealed vial in ambient conditions for up to 4 weeks. Immediately prior to coating, the solution was filtered through a 0.2 um PTFE syringe filter and 1% v/v of 4,4-dimethyl-2-pentanone and 0.5% v/v diisopropylethylamine were added and stirred. This solution was them used directly for coating.

Small scale device fabrication: 1"×1" pieces of ITO coated glass with a sheet resistance of 12 ohm/sq. were cleaned in a sonic bath of 10% alconox in water solution for 5 min. The substrates were rinsed in deionized water then transferred to a sonic bath of acetone for an additional 5 min. After drying under a stream of $N_2$, the substrates were transferred to a sonic bath of isopropyl alcohol for an additional 5 minutes and dried under a stream of $N_2$. The substrates were then treated in a UV-$O_3$ cleaner for 15 minutes immediately prior to $SnO_2$ coating. Prior to coating, a solution of 15% $SnO_2$ suspended in water (purchased from Sigma) was sonicated for 15 minutes. This solution was then diluted to 3% v/v in water. This solution was then used directly for spin coating according to the following parameters: 300 uL volume of solution at 3000 rpm with a ramp rate of 3000 rpm/s for 30 s. The $SnO_2$ was cleaned off of a small section of the ITO with water in order to make a better electrical contact with the ITO when measuring the final device. The $SnO_2$ coated substrates were then annealed in ambient conditions at 150° C. for 30 minutes.

Prior to coating the perovskite active layer, the $SnO_2$ coated substrates were treated in a UV-$O_3$ cleaner for 15 minutes to improve wetting. A customized Coatema Easycoater station was used for all blade coating and all steps were done in ambient conditions (relative humidity varied between 10% and 60%) unless otherwise stated. The perovskite active layer was blade coated in ambient conditions with an $N_2$ knife positioned approximately 10 cm behind the leading edge of the blade and approximately 3 cm above the surface of the substrate. The flow rate was set to the lowest possible rate and was simply used to regulate the air flow surrounding the substrate and to keep small debris away from the surface of the substrate. Typical blade coating settings were as follows but were adjusted to change the thickness of the active layer as necessary: 180 um gap, 15 uL of perovskite solution, and 2 m/min coating speed. After coating, the substrates were annealed in ambient conditions at 50° C. for 5 minutes and then at 130° C. for 3 minutes. The substrates were then transferred to a purge box where the humidity was kept below 1%.

The HTL layer was deposited from a solution of 72 mg spiro-OMeTAD in 1 mL CB, 28.8 µL TBP, and 17.5 µL of a solution of 520 mg/mL LiTFSI in 1 mL AcN that was combined in a glovebox (<1 ppm $H_2O$ and <1 ppm $O_2$). This HTL solution was then spin coated in a dry (<1% relative humidity) air environment on the perovskite layer at 4000 rpm, with a ramp rate of 2500 rpm/s, and a total time of 30 s. Finally, a 10 nm layer of $MoO_x$ was thermally evaporated on top of the HTL layer and 100 nm of Ag was thermally evaporated on top of that to complete the devices.

Examples: First Example Set

Example 1. A mixture comprising: a perovskite precursor; a solvent; and an additive comprising at least one of a first amine, a ketone, an aldehyde, a non-nucleophilic sterically hindered base, or a halogen-containing compound, wherein: upon removal of the solvent and the additive, the perovskite precursor is capable of being transformed into a perovskite.

Example 2. The mixture of Example 1, wherein the additive is present at a first concentration relative to the solvent between greater than 0% v/v and less than or equal to 20% v/v.

Example 3. The mixture of Example 2, the first concentration is between greater than 0% v/v and less than or equal to 10% v/v.

Example 4. The mixture of Example 3, wherein the first concentration is between greater than 0% v/v and less than or equal to 2% v/v.

Example 5. The mixture of Example 1, wherein: the perovskite has a stoichiometry of $ABX_3$, A is a first cation, B is a second cation, and X is an anion.

Example 6. The mixture of Example 1, wherein the perovskite precursor comprises at least one of methylammonium chloride (MACl), methylammonium bromide (MABr), methylammonium iodide (MAI), formamidinium chloride (FACl), formamidinium bromide (FABr), formamidinium iodide (FAI), lead iodide ($PbI_2$), tin iodide, cesium chloride, cesium bromide, or cesium iodide.

Example 7. The mixture of Example 6, wherein the perovskite precursor is selected to target the formation the perovskite having a stoichiometry of $FA_xMA_yCs_{(1-x-y)}PbI_3$, $0<x<1$, and $0<y<1$.

Example 8. The mixture of Example 1, wherein the solvent comprises at least one of a second amine, acetonitrile, benzonitrile, dimethylacetate, propylamine, propylene carbonate, valeronitrile, N-methylpyrrolidone, tetrahydrofuran, ethyl acetate, acetone, dimethylformamide, or dimethyl sulfoxide.

Example 9. The mixture of Example 8, wherein the second amine comprises at least one of methylamine, triethylamine, t-butylamine, n-butylamine, dibutylamine, or morpholine.

Example 10. The mixture of Example 1, wherein the ketone comprises at least one of 4,4-dimethyl-2-pentanone, acetone, 2-heptanone, or 2,4-dimethyl-3-pentanone.

Example 11. The mixture of Example 1, wherein the aldehyde comprises at least one of acetaldehyde or benzaldehyde.

Example 12. The mixture of Example 1, wherein the non-nucleophilic sterically hindered base comprises at least one of diisopropylethylamine, triethylamine, 2,6-di-t-butylpyridine, or 1,8-diazabicycloundec-7-ene.

Example 13. The mixture of Example 1, wherein the first amine comprises at least one of methylamine, triethylamine, t-butylamine, n-butylamine, dibutylamine, or morpholine.

Example 14. The mixture of Example 1, wherein the halogen-containing compound and the perovskite precursor are at a ratio (halogen-containing compound:perovskite precursor) between greater than 0.0:1.0 and equal to 1.0:2:0.

Example 15. The mixture of Example 14, wherein the halogen-containing compound comprises methylammonium chloride (MACl).

Example 16. The mixture of Example 15, wherein the perovskite precursor comprises methylammonium iodide (MAI).

Example 17. The mixture of Example 16, wherein the ratio is between about 0.02:1.0 and about 1.0:1.0.

Example 18. The mixture of Example 6, wherein the perovskite precursor comprises $PbI_2$ at a second concentration between about 0.01 moles of $PbI_2$ per liter of solvent and about 10 moles of $PbI_2$ per liter of solvent, inclusively.

Example 19. The mixture of Example 18, wherein the second concentration is between about 0.1 moles of $PbI_2$ per liter of solvent and about 4.0 moles of $PbI_2$ per liter of solvent, inclusively.

Example 20. The mixture of Example 1, wherein the additive comprises 4,4-dimethyl-2-pentanone.

Example 21. The mixture of Example 20, wherein the 4,4-dimethyl-2-pentanone is at a third concentration between 0.1 v/v % and 20 v/v %, inclusively, relative to the solvent.

Example 22. The mixture of Example 21, wherein the additive further comprises diisopropylethylamine.

Example 23. The mixture of Example 22, wherein the diisopropylethylamine is at a fourth concentration between about 0.01 v/v % and about 10 v/v %, inclusively.

Example 24. The mixture of Example 1, wherein the solvent comprises acetonitrile.

Example 25. The mixture of Example 24, wherein the solvent further comprises methylamine.

Example 26. The mixture of Example 1, further comprising water.

Example 27. The mixture of Example 26, wherein the water is soluble in the mixture.

Example 28. The mixture of Example 26, wherein the water is present as a second phase in the mixture.

Examples: Second Example Set

Example 1. A method comprising: combining a perovskite precursor, a solvent, and an additive to form a mixture; applying the mixture to a substrate; and treating the mixture, wherein: the treating results in the removing of at least a portion of the solvent and the additive and the forming of a perovskite.

Example 2. The method of Example 1, wherein the additive comprises at least one of a first amine, a ketone, an aldehyde, a non-nucleophilic sterically hindered base, or a halogen-containing compound.

Example 3. The method of Example 2, wherein the additive is at a first concentration, relative to the solvent, between greater than 0% v/v and less than or equal to 20% v/v.

Example 4. The method of Example 3, wherein the ketone comprises at least one of 4,4-dimethyl-2-pentanone, acetone, 2-heptanone, or 2,4-dimethyl-3-pentanone.

Example 5. The method of Example 3, wherein the aldehyde comprises at least one of acetaldehyde or benzaldehyde.

Example 6. The method of Example 3, wherein the non-nucleophilic sterically hindered base comprises at least one of diisopropylethylamine, triethylamine, 2,6-di-t-butylpyridine, or 1,8-diazabicycloundec-7-ene.

Example 7. The method of Example 1, wherein the perovskite precursor is selected to target the perovskite having a stoichiometry of $FA_xMA_yCs_{(1-x-y)}PbI_3$, $0<x<1$, and $0<y<1$.

Example 8. The method of Example 1, wherein the solvent comprises at least one of a second amine, acetonitrile, benzonitrile, dimethylacetate, propylamine, propylene carbonate, valeronitrile, N-methylpyrrolidone, tetrahydrofuran, ethyl acetate, acetone, dimethylformamide, or dimethyl sulfoxide.

Example 9. The method of Example 8, wherein the second amine comprises at least one of methylamine, triethylamine, t-butylamine, n-butylamine, dibutylamine, or morpholine.

Example 10. The method of Example 1, wherein the applying is accomplished using at least one of blade coating, slot die coating, roll-to-roll coating, spin coating, gravure coating, aerosol coating, or inkjet printing.

Example 11. The method of Example 1, wherein at least one of the mixing, the applying, or the treating is performed in an environment having a relative humidity between 0% and 100%.

Example 12. The method of Example 11, wherein the relative humidity is between about 30% and 40%.

Example 13. The method of Example 1, wherein the treating comprises heating the mixture to a temperature between about 50° C. and about 300° C.

Example 14. The method of Example 13, wherein the temperature is between about 100° C. and about 150° C.

Example 15. The method of Example 1, wherein the treating is performed for a period of time between about 30 seconds and about 10 hours.

Example 16. The method of Example 15, wherein the period of time is between about one minute and about one hour.

Example 17. The method of Example 1, wherein the perovskite has a thickness between about 10 nm and about 2000 nm.

Example 18. The method of Example 1, wherein the substrate is flexible.

Example 19. The method of Example 18, wherein the substrate comprises at least one of polyethylene napthalate, polyethylene terephthalate, polyimide, polyvinylfluoride, or glass.

Example 20. The method of Example 1, wherein the mixture further comprises water.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A mixture comprising:
    a perovskite precursor;
    a solvent; and
    an additive comprising 4,4-dimethyl-2-pentanone, wherein:
    the additive is present at a concentration relative to the solvent between greater than 0% v/v and less than or equal to 20% v/v, and
    upon removal of the solvent and the additive, the perovskite precursor is capable of being transformed into a perovskite.

2. The mixture of claim 1, wherein:
    the perovskite has a stoichiometry of $ABX_3$,
    A is a first cation,
    B is a second cation, and
    X is an anion.

3. The mixture of claim 1, wherein the perovskite precursor comprises at least one of methylammonium chloride, methylammonium bromide, methylammonium iodide, formamidinium chloride, formamidinium bromide, formamidinium iodide, lead iodide ($PbI_2$), tin iodide, cesium chloride, cesium bromide, or cesium iodide.

4. The mixture of claim 3, wherein the perovskite precursor comprises $PbI_2$ at a concentration between about 0.01 moles of $PbI_2$ per liter of solvent and about 10 moles of $PbI_2$ per liter of solvent, inclusively.

5. The mixture of claim 1, wherein the additive further comprises at least one of acetone, 2-heptanone, or 2,4-dimethyl-3-pentanone.

6. The mixture of claim 1, wherein the additive further comprises at least one of acetaldehyde or benzaldehyde.

7. The mixture of claim 1, wherein the halogen-containing compound and the perovskite precursor are at a ratio of thehalogen-containing compound to the perovskite precursor between greater than 0.0:1.0 and equal to 1.0:2.0.

8. The mixture of claim 1, wherein the 4,4-dimethyl-2-pentanone is at a third concentration between 0.1 v/v % and 20 v/v %, inclusively, relative to the solvent.

9. The mixture of claim 8, wherein the additive further comprises diisopropylethylamine.

10. The mixture of claim 9, wherein the diisopropylethylamine is at a fourth concentration between about 0.01 v/v % and about 10 v/v %, inclusively, relative to the solvent.

11. The mixture of claim 1, further comprising water.

12. The mixture of claim 11, wherein the water is soluble in the mixture.

13. The mixture of claim 11, wherein the water is present as a second phase in the mixture.

14. The mixture of claim 1, wherein the solvent comprises at least one of a second amine, acetonitrile, benzonitrile, dimethylacetate, propylamine, propylene carbonate, valeronitrile, N-methylpyrrolidone, tetrahydrofuran, ethyl acetate, acetone, dimethylformamide, or dimethyl sulfoxide.

15. The mixture of claim 1, further comprising at least one of diisopropylethylamine, triethylamine, 2,6-di-t-butylpyridine, or 1,8-diazabicycloundec-7-ene.

16. A method comprising:
    combining a perovskite precursor, a solvent, and 4,4-dimethyl-2-pentanone to form a mixture;
    applying the mixture to a substrate; and
    treating the mixture, wherein:
    the 4,4-dimethyl-2-pentanone is present at a concentration relative to the solvent between greater than 0% v/v and less than or equal to 20% v/v, and the treating results in the removing of at least a portion of the solvent and the 4,4-dimethyl-2-pentanone additive and the forming of a perovskite.

17. The method of claim 16, wherein at least one of the combining, the applying, or the treating is performed in an environment having a relative humidity between 0% and 100%.

18. The method of claim 17, wherein the relative humidity is between about 30% and 40%.

19. The method of claim 17, wherein the mixture further comprises water.

20. The method of claim 16, wherein the solvent comprises at least one of a second amine, acetonitrile, benzonitrile, dimethylacetate, propylamine, propylene carbonate, valeronitrile, N-methylpyrrolidone, tetrahydrofuran, ethyl acetate, acetone, dimethylformamide, or dimethyl sulfoxide.

21. The method of claim 16, wherein the applying of the mixture to the substrate is performed using is accomplished using at least one of blade coating, slot die coating, roll-to-roll coating, spin coating, gravure coating, aerosol coating, or inkjet printing.

22. The method of claim 16, wherein the substrate is flexible.

23. The method of claim 22, wherein the substrate comprises at least one of a polyethylene napthalate, a polyethylene terephthalate, a polyimide, a polyvinylfluoride, or a glass.

* * * * *